Sept. 15, 1970   G. N. MILES   3,528,155
METHOD OF MAKING HELICALLY CORRUGATED FLEXIBLE TUBULAR DUCT OF
METAL FOIL AND FOR INSULATING SAME
Filed July 10, 1968   4 Sheets-Sheet 1
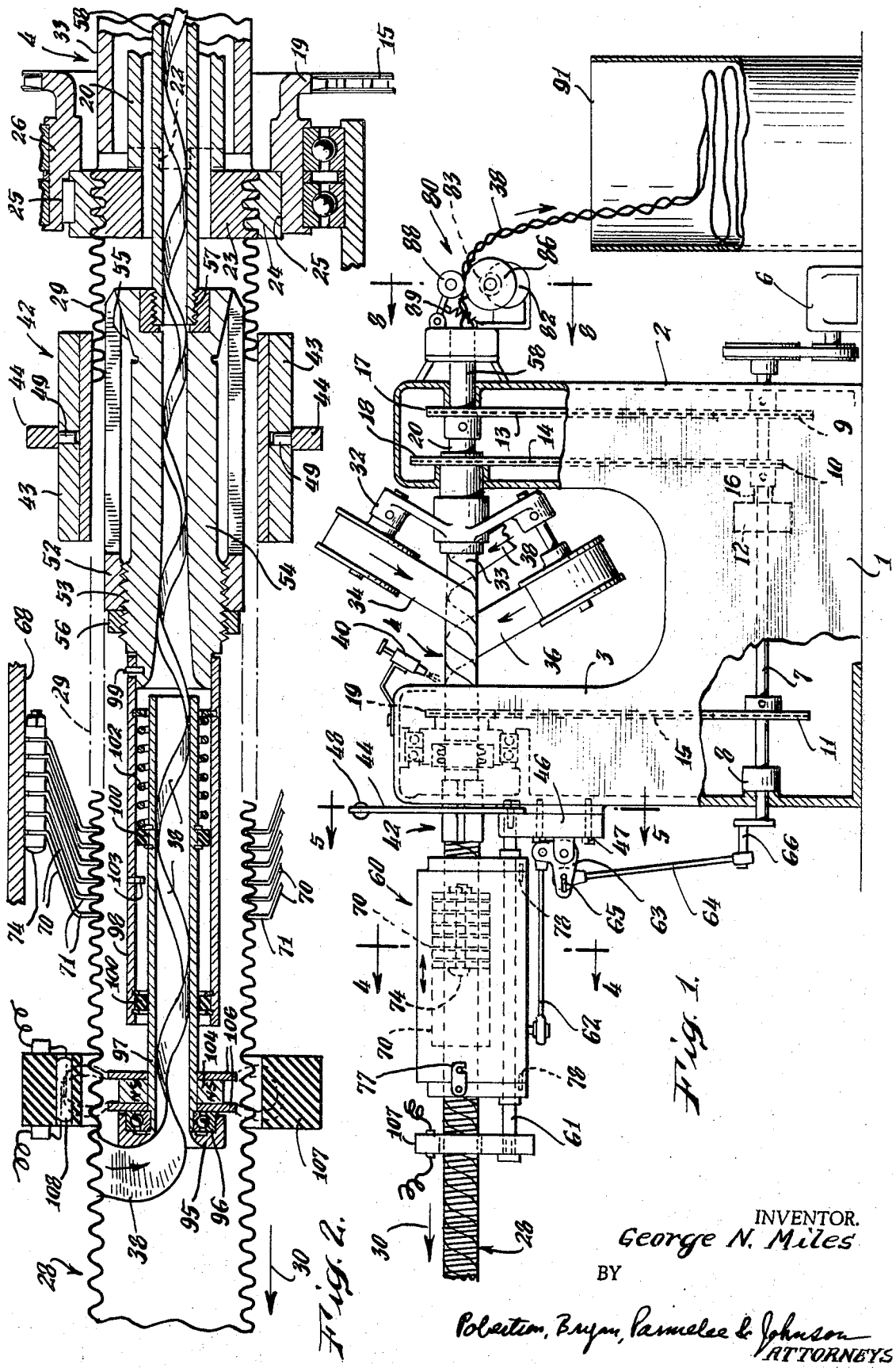
INVENTOR.
George N. Miles
BY
Robertson, Bryan, Parmelee & Johnson
ATTORNEYS Sept. 15, 1970  G. N. MILES  3,528,159
METHOD OF MAKING HELICALLY CORRUGATED FLEXIBLE TUBULAR DUCT OF
METAL FOIL AND FOR INSULATING SAME
Filed July 10, 1968  4 Sheets-Sheet 2
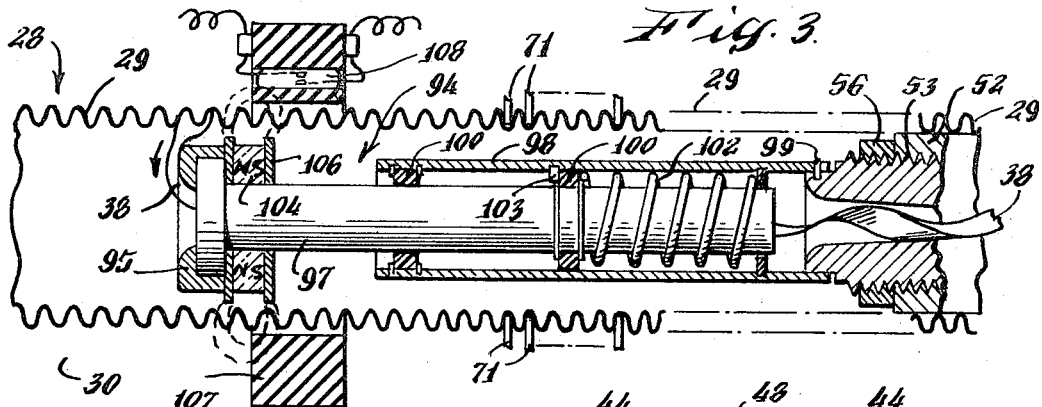
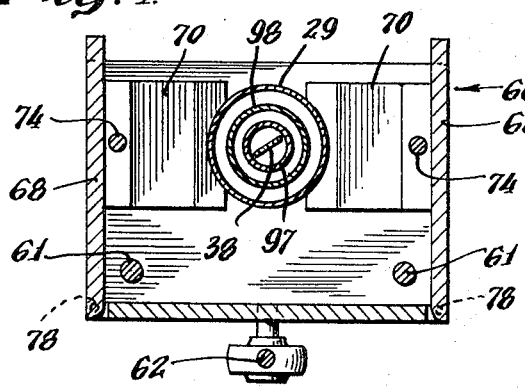
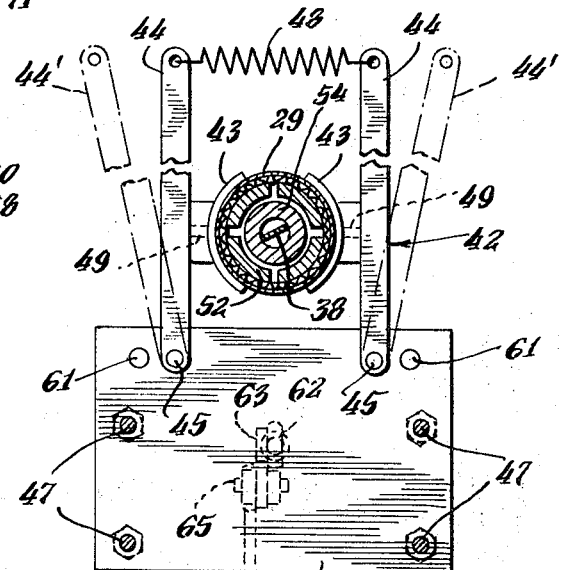
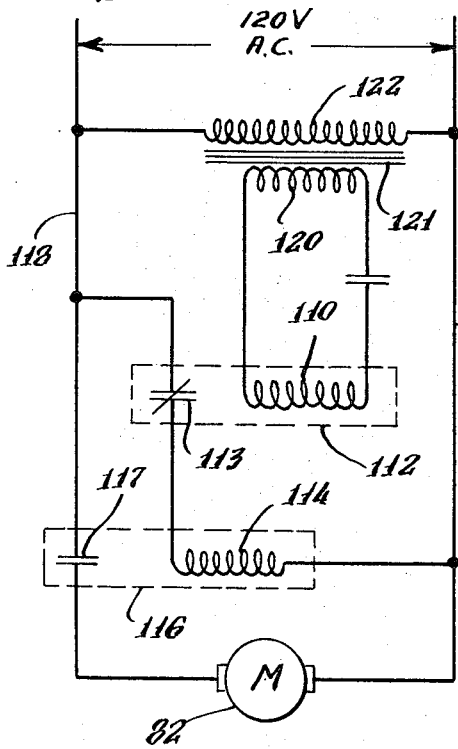
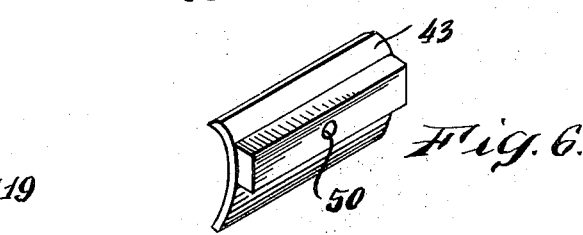
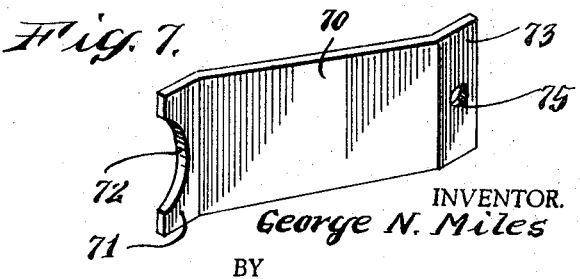
INVENTOR.
George N. Miles
BY
Robertson, Bryan, Parmelee & Johnson
ATTORNEYS INVENTOR.
George N. Miles Sept. 15, 1970 G. N. MILES 3,528,159
METHOD OF MAKING HELICALLY CORRUGATED FLEXIBLE TUBULAR DUCT OF
METAL FOIL AND FOR INSULATING SAME
Filed July 10, 1968 4 Sheets-Sheet 4
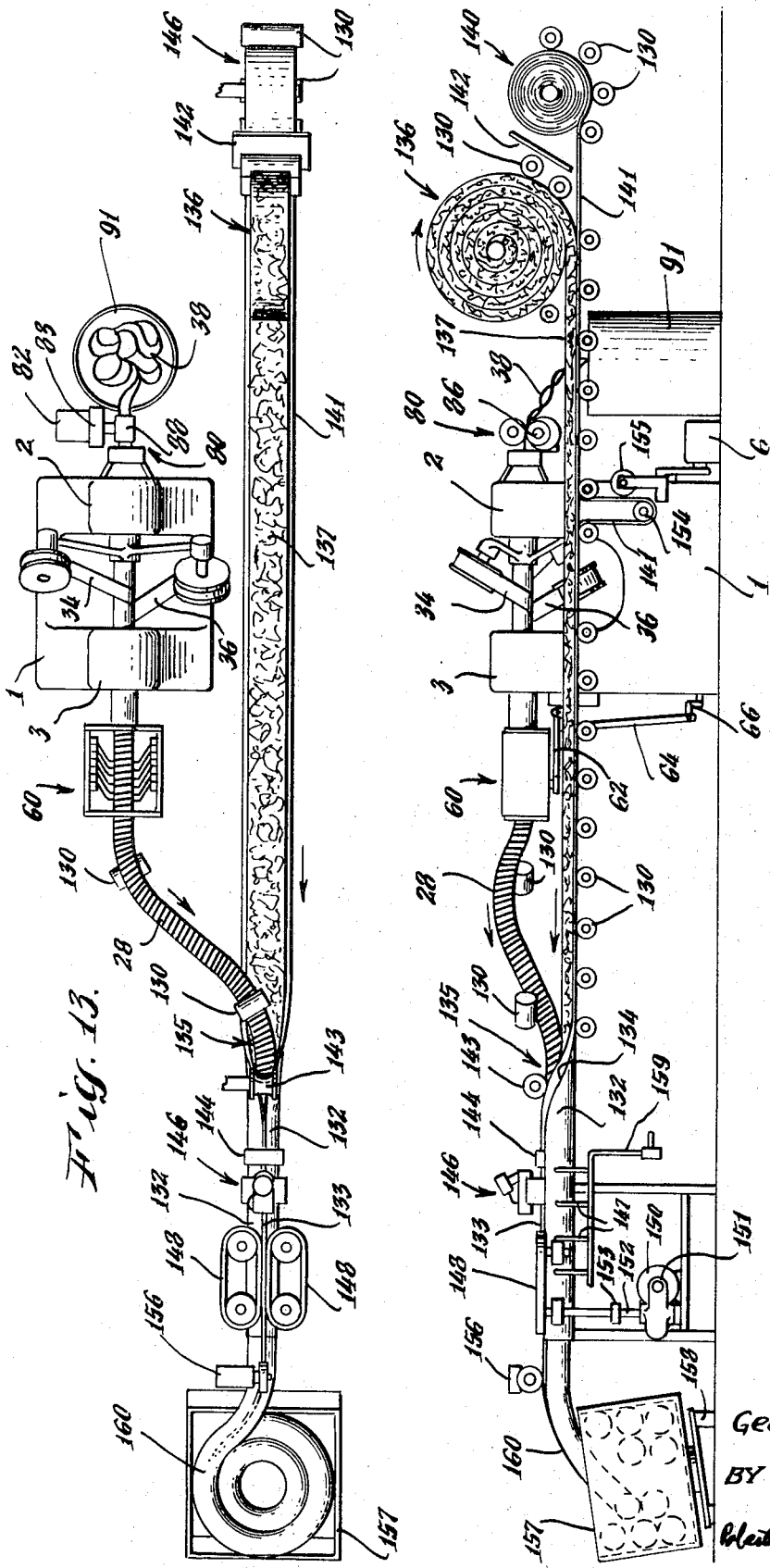
INVENTOR.
George N. Miles
BY
ATTORNEYS.

United States Patent Office 3,528,159
Patented Sept. 15, 1970

3,528,159
METHOD OF MAKING HELICALLY CORRUGATED FLEXIBLE TUBULAR DUCT OF METAL FOIL AND FOR INSULATING SAME
George N. Miles, Tenafly, N.J., assignor to Calmac Manufacturing Corporation, Englewood, N.J., a corporation of New York
Filed July 10, 1968, Ser. No. 743,878
Int. Cl. B23p *17/00*
U.S. Cl. 29—423
8 Claims

ABSTRACT OF THE DISCLOSURE

Process and machine for manufacturing helically corrugated flexible tubular duct from metal foil strips and for insulating same, the metal foil strips being initially wound around a hollow mandrel with a left-hand helix on top of a similarly wound strip of paper so as to form a tubular wall having multiple plies of metal foil with a single interior ply of paper. The tubular wall is fed between revolving inner and outer meshing screw threaded dies which corrugate the tubular wall with a closely packed right-hand helix while at the same time feeding the corrugated wall forwardly by its screw action. Reciprocating ratchet means engage the valleys of the corrugated wall for axially stretching the closely packed corrugations, the paper strip then being separated from the corrugated tubular wall by peeling it off from the interior of the duct and pulling it out rearwardly through the hollow mandrel structure. Sensing means is responsive to the locus of the peeling separation of the paper strip from the duct wall for automatically synchronizing the average rate at which the paper is being pulled out rearwardly, the pulling force being controlled to be less than the breaking strength of the paper, thus creating an all metal multiple-ply foil duct which is substantially air-tight, and a layer of insulation enclosed by an outer covering is applied to the all-metal duct as it continues to feed forwardly, thus making long lengths of such insulated duct at a minimum expense.

This invention relates to a process and machine for manufacturing a helically corrugated flexible tubular duct formed of metal foil and for insulating the duct, and more particularly relates to a process and apparatus for making such a flexible duct formed substantially air-tight of helically wound strips of metal foil, the duct being enclosed by insulation after it has been formed. The present invention provides a number of important technological advances over the prior art machine of the general type described in U.S. Pat. No. 2,002,869—Kopetz.

Among the advantages of the process and machine embodying the present invention are those resulting from the fact that it enables a helically corrugated flexible tubular duct to be manufactured of metal foil in long continuous lengths so that the resultant duct is constructed solely of metal and is substantially air-tight and adapted to be enclosed in insulation for air conditioning installations. This all-metal flexible duct is markedly less expensive than the prior art ducts, and moreover it contains no combustible paper material with the advantageous result that it can be installed within walls and partitions in locations where the duct extends through fire stops, meeting approval for such installation because the duct is of all-metal construction and being adapted for application of insulation thereto. The machine shown in the Kopetz patent is disclosed as using paper strips to form the corrugated tube, and when it uses metal foil strips, they are covered with paper on both surfaces. The paper serves as an interface material which slides against the inner and outer screw threaded forming die surfaces to protect the die surfaces from contact with the metal foil and to reduce the frictional drag at the die surfaces. When the prior art tubing has been formed in the Kopetz machine the paper layers remain both on the inside and on the outside, and are difficult to remove unless the duct was made in relatively short lengths. These multiple layers of paper in the prior art increase the amount of material necessary for manufacturing the duct and consequently increases its cost; moreover, the presence of paper places temperature limitations upon the heat of the gaseous fluid which can be pumped through the duct and imposes strict limitations upon the installation of the duct under fire laws and building codes. If the prior art duct was desired to be insulated it was necessary to laboriously peel off both the inner and outer paper layer by hand before applying insulation thereto.

According to the present invention a duct is enabled to be manufactured wherein the foil is initially coated with paper only on the side which will form the interior of the duct and this paper is then stripped automatically away in a controlled manner from the inner surface immediately after the duct has been helically corrugated and the corrugations have been axially stretched. The resultant all-metal duct is substantially air-tight and is insulated for air conditioning as well as heating services.

In the specification is described a process and machine for manufacturing helically corrugated flexible tubular duct of metal foil and for insulating the duct, embodying the present invention, and it is to be understood that this process and machine are described as being illustrative of the present invention and as the best mode now contemplated by the inventor for placing his invention into practice.

The various features, aspects and advantages of the present invention will become more fully understood from a consideration of the following description when read in conjunction with the accompanying drawings, in which:

FIG. 1 is a side-elevational view of a tubular-duct manufacturing machine embodying the present invention;

FIG. 2 is an axial sectional view of the forming die section and corrugation stretching and paper strip peeling separation stages of the machine and associated element shown on enlarged scale; the material to be formed enters FIG. 2 from the right and passes toward the left;

FIG. 3 is an axial sectional view similar to that shown in FIG. 2 for illustrating the cooperating parts in different relative operating positions;

FIG. 4 is a cross-sectional view along the line 4—4 in FIG. 1 and shown on enlarged scale showing stretching mechanism for increasing the axial spacing between successive helical corrugations of the tubular duct;

FIG. 5 is a cross-sectional view taken along the line 5—5 in FIG. 1 and shown on the same enlarged scale as FIG. 4 illustrating the friction-gripping jaws for gripping the tubular duct between the forming die section and the axial duct-stretching stage shown in FIG. 4.

FIG. 6 is a perspective view of one of the frictional-gripping jaw members included in the apparatus of FIG. 5 for gripping the exterior of the duct;

FIG. 7 is an enlarged perspective view of one of a plurality of ratchet-spring fingers which grip the exterior surface of the duct in the valleys between corrugations, as illustrated also in FIGS. 2, 3 and 4;

FIG. 9 is a schematic-circuit diagram of the electrical circuit for controlling the automatic paper removing operation;

FIG. 12 is an elevational view of the machine illustrating the automatic application of the insulation surrounding the duct; and FIG. 13 is a top view of the machine of FIG. 12.

Figure 11:
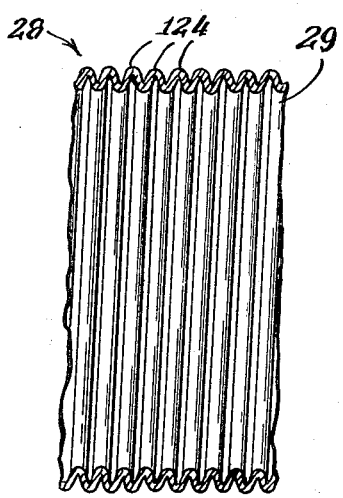
FIGS. 11 and 11A are axial sectional views illustrating the resulting configuration of the wall of the duct itself.

As shown in FIG 1, the machinery embodying the present invention and practicing the process thereof has a main frame 1 of generally U-shaped configuration including a pair of upright-support members 2 and 3 which serve as housings for enclosing portions of the drive mechanism and serve to support the hollow mandrel assembly generally indicated at 4. The main drive motor 6 rotates a countershaft 7 which extends through the base portion of the machine frame 1 and is journaled in a bearing 8. This countershaft 7 carries two sprockets 9 and 11, and a change-gear box 12 provides a driving connection between shaft 7 and a stub shaft 16 which turns a sprocket 10 in the opposite direction from the sprockets 9 and 11. The sprockets 9, 10 and 11 serve for driving various components of the mandrel assembly by means of the respective sprocket chains 13, 14 and 15, engaging the sprockets 17, 18, and 19 secured to various parts of the mandrel assembly 4, as will be explained in detail further below. By changing gears in the box 12 the speed of rotation of the sprocket 18 can be changed relatively to sprockets 17 and 19.

The drive path 9, 13, 17 serves to rotate a hollow shaft 20 (see also FIG. 2) which is attached by a disengageable positive drive connection 22 with the inner helical screw threaded hollow die 23. In this way the die 23 is rotated, the connection 22 being formed by projecting dogs on the rear face of the inner die 23 which engage in recesses in the end of the hollow drive shaft 20.

Meshing with the inner die 23 is an outer helical screw threaded die 24 which seats in a socket 25 in the hub portion 26 of the procket 19. The die 24 is keyed to the hub 26 to be positively driven by the drive path 11, 15, 19, 26. It is noted that the respective sprockets 9 and 11 are the same diameter and the respective sprockets 17 and 19 are the same diameter. Thus, the inner and outer dies 23 and 24 are rotated at exactly the same rate, and they helically corrugate the tubular wall 27 of the duct 28 (FIG. 1) while feeding the duct to the left by a screw action, as indicated by the arrow 30.

The dies 23 and 24 are readily removable by pulling them both to the left, thus simultaneously disengaging them repsectively from the shaft 20 and from hub 26. After the dies 23 and 24 are removed, they are readily separated by unscrewing one from the other.

To form the duct, a spool assembly 32 is revolved by the sprocket 18 around a hollow forming mandrel 33 which is concentric with and surrounds the hollow shaft 20. A pair of strips of metal foil 34 and 36, preferably aluminum foil having a thickness of 0.003 of an inch, are fed from respective spools carried by the revolving spool assembly 32, as shown in FIG. 1, in a left hand helical wrap to form the duct wall 29, as will be explained in detail further below in connection with FIG. 10. A strip of kraft paper 38 is fed from a third spool (not seen) carried by the revolving spool assembly 32 to form a temporary inner ply of the duct wall 29. As shown by the relative sizes of the sprockets 10 and 18 (FIG. 1) the spool assembly 32 revolves at about one-half the r.p.m. rate of the dies 23 and 24. The relative rate is determined by the pitch at which the strips 34, 36 and 38 are applied.

The inner paper layer engages the inner die 23 and serves to prevent the aluminum foil from engaging the die, thus reducing friction and avoiding scouring of the inner die or jamming of the metal. This inner die 23 is the more critical of the two dies with respect to its operating conditions, and the presence of the inner paper layer avoids metal-to-metal contact.

To reduce friction between the outer die 24 and the aluminum wall 29, the outer strip of foil 36 is previously coated on the exposed portion of its outer surface with a baked-on dry film lubricant, such as can be formed by molybdenum disulphide and a liquid carrier which is evaporated by baking. In addition to the dry film lubricant, the outer surface of the wall 29 is lubricated (as shown in FIG. 1) by an oil spray mist applied by an air-driven oil atomizer spray nozzle 40, just before the tubular wall 29 enters between the corrugating dies 23 and 24. These dies corrugate the wall 29 with closely packed corrugations in a right hand helix.

In order to hold the tubular wall 29 against turning, a stationary holding assembly 42 is used, as shown in detail in FIG. 2, 5 and 6. This holding assembly 42 includes a pair of concave cylindrical gripping jaw members 43 which are removably connected to a pair of arms 44 pivotally attached at 45 to a mounting plate 46 secured by bolts 47 to the upright support 3.

A tension spring 48 urges the arms 44 toward each other so as to press the jaw members 43 against the outside of the tubular wall 29. A retainer pin 49 on the inside of each arm 44 removably seats in a hole 50 (FIG. 6) in the outside of each jaw member 43. By swinging the arms 44 outwardly as indicated in FIG. 5 in dash and dot outline at 44', the jaw members 43 can readily be removed.

The holding assembly 42 also includes an inner stationary arbor 52 which is longitudinally fluted on its exterior surface. These longitudinal flutes, as seen in FIG. 5, engage the kraft paper lining of the tubing wall 29 to prevent it from twisting.

To enable adjustment of the effective outside diameter of the arbor 52, its downstream end is screwed at 53 onto the threaded downstream end of a hollow core piece 54 having an outwardly tapered upstream end 55. The arbor 52 is longitudinally slotted as shown in FIGS. 2 and 5 to form four sectors. By screwing the arbor 52 upstream relative to the core piece 54, the taper 55 wedges the four sectors of the arbor outwardly to increase its effective diameter, and vice versa. A lock nut 56 secures the adjusted position.

The core piece 54 is fastened by a tight screw connection 57 to a hollow stationary shaft 58 which extends through the hollow mandrel assembly 4 and is secured to the upright support 2.

For stretching the closely packed convolutions of the tubing wall 29, an axially reciprocatable slide assembly 60 (see also FIG. 4) is mounted on a pair of round slide ways 61 which are secured to the mounting plate 46 (FIG. 1). The assembly 60 is reciprocated axially by a push rod 62 attached to an arm of lever 63 pivotally mounted on the plate 46. A connecting rod 64 is adjustably attached at 65 to another arm of the lever 63 and to a revolving crank 66 on the end of the shaft 7. The length of the stroke of the assembly 60 is adjusted by means of the adjustable connection 65.

The assembly 60 includes a pair of side plates 68 (FIG. 4) to each of which are attached a plurality of spring ratchet fingers 70 converging in a downstream direction with the duct wall 29. These spring fingers 70 (FIG. 7) have their inner ends 71 bent inwardly generally perpendicular to the axis of the duct 30, and shaped with a concave end surface 72 adapted to engage the outside of the wall 29 in the valley between successive convolutions, as shown in FIGS. 2 and 3.

The outer ends 73 of these spring fingers are secured to the side plates 68 by bolts 74 (see also FIG. 2) passing through the respective holes 75.

When the slide assembly 60 moves downstream, i.e. to the left in FIG. 1, the finger ends 71 engage in the valleys and pull the localized region of the duct axially toward the left, thus stretching the duct axially to space the convolutions further apart. When the slide assembly 60 moves back toward the right, the spring fingers 70 flex outwardly so that their surfaces 72 slide over the ridges of the convolutions. The stretching hitch feed action of the multiple fingers 70 occurs at an average feed rate greater than the screw feed rate of the dies 23, 24 so as to stretch open the corrugations.

In order to quickly open up the slide assembly 60, latches 77 (FIG. 1) are unhooked, and the side plates 68 are swung outwardly about hinge pins 78 (FIG. 4).

Figure 8:
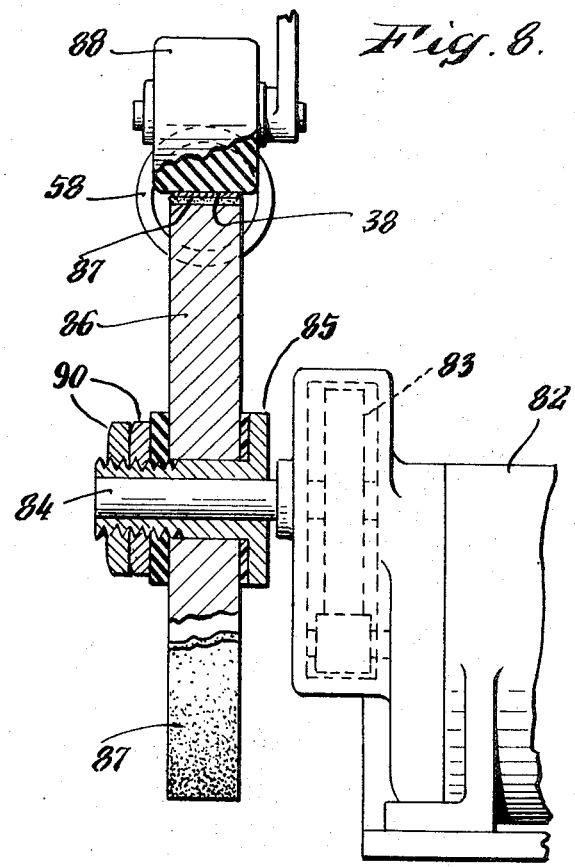
FIG. 8 is a cross-sectional view taken along the line 8—8 looking toward the left in FIG. 1, this FIG 8 being shown on enlarged scale and illustrating the capstan wheel mechanism serving to pull and peel the paper strip from the interior of the tubular duct after it has been formed and helically corrugated and axially stretched.

For automatically peeling the temporary kraft paper liner 38 from the interior surface of the duct 28, a paper strip windlass, generally indicated at 80 (FIG. 1) is mounted on the right (upstream) end of the machine. This windlass 80 is shown in greater detail in FIG. 8, and it includes a drive motor 82, speed reduction gearing 83 driving a shaft 84 and an adjustable friction clutch 85 mounted on the shaft 84. This friction clutch 85 drives a pulling wheel 86 having a roughened rim 87 which is tangent to the axis of the hollow mandrel assembly 4.

The paper strip 38 which is being peeled off from the interior surface of the wall 29 is pulled along the bore of the hollow shaft 58. The paper strip passes between the roughened gripping surface 87 and an upper follower roll 88 which is urged by a spring 89 (FIG. 1) to apply pinch pressure to the paper strip 38.

The lock nuts 90 (FIG. 8) of the friction clutch 85 are adjusted so that the torque being applied to the pulling wheel 86 is less than the breaking strength of the paper strip 38. After passing the windlass mechanism 80, the removed paper strip falls freely into a waste paper bin 91.

To control the windlass motor 82, there is provided a paper strip-off spinner and sensing means, generally indicated at 94 in FIGS. 2 and 3, including a rounded freely rotatable annular nose piece 95 of hard wear-resistant material mounted upon a ball-bearing unit 96 on the end of a tubular sleeve support 97. This sleeve 97 slides axially in telescoping relationship within a sleeve 98 which is secured by a bayonet lug connection 99 to the downstream end of the core piece 54. A pair of sliding bearing collars 100 of durable slipper plastic material serve to support the sleeve 97 while permitting its axial movement. A compression spring 102 urges the sleeve 97 to move in a downstream direction, thus pressing the nosepiece 95 firmly against the paper strip 38 being peeled off. A stop pin 103 limits the range of movement of the sleeve 97.

A permanent magnet 104 of ring shape is mounted near the nose piece 95 between a pair of steel washers 106, which provide a pair of spaced annular magnetically permeable pole pieces. The magnetic flux extending between the rims of the pole pieces 106, loops outwardly as shown by the dashed lines in FIGS. 2 and 3 passing through the aluminum wall 29. A non-magnetic support member 107 secured to the ends of the slide ways 61 holds a magnetically-actuatable reed switch 108 fixed in position near the aluminum wall 29.

As the duct 28 moves downstream (arrow 30) the spring 102 causes the paper strip-off spinner 94 to move downstream along with the bight (curve) of paper strip 38. FIG. 3 shows the spinner 94 in the extreme limit of its downstream movement. At this downstream position the magnetic field has shifted a distance of about an inch, allowing the normally-open contacts of the reed switch 108 to open, thus causing the windlass motor 82 to become energized, as will be explained with reference to FIG. 9.

As shown in FIG. 9, when the contacts 109 of the reed switch 108 are allowed to open, they deenergize the solenoid winding 110 of a pilot relay 112 having normally-closed contacts 113, thus allowing the contacts 113 to close. These contacts 113 are in a circuit in series with a solenoid winding 114 of a time-delay power relay 116 having normally-open contacts 117, the circuit including contacts 113 and winding 114 extending between a pair of alternating-current power lines 118 and 119 of conventional voltage of 117 to 120 volts A.C. After the brief time-delay period of relay 116 has passed, its contacts 117 are closed by the energized winding 114, thus supplying electrical power from the lines 118 and 119 to the windlass motor 82 causing it to run.

The pulling rate of the windlass wheel 86 exceeds the rate at which the duct 28 is moving downstream (arrow 30) so that there is axial retrogression of the locus of peeling separation of the paper strip 38 from the duct wall 29. Thus, the bight of the paper strip retrogresses toward the right, pushing back the spinner nosepiece 95, and compressing the spring 102, as shown in FIG. 2, until the magnetic pole pieces 106 become aligned with the proximity reed switch 108. The magnetic field then closes the contacts 109 of the reed switch 108 causing the windlass motor 82 to stop pulling for a brief period of time until the pulling cycle repeats itself.

The reed contacts 109 and winding 110 are in circuit in series with the low-voltage (24 volts) secondary winding 120 of a step-down transformer 121 having its primary winding 122 connected across the lines 118 and 119.

Figure 10:
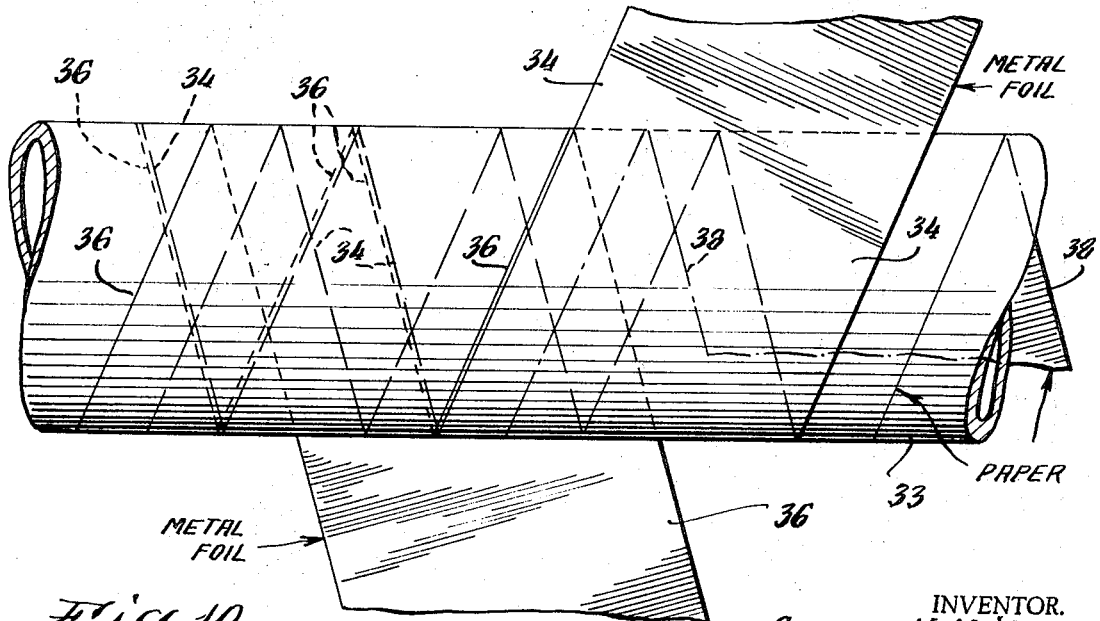
FIG. 10 shows the way in which the two strips of foil are wound around the forming mandrel on top of a strip of paper so as to begin forming the wall of the tubular duct.

As shown in FIG. 10 the kraft paper strip 38 and the metal foil strips 34 and 36 are all of the same width and are wrapped around the forming mandrel 33 at a helix angle of approximately 70°. The result is an overlap of the paper strip 38 so as to cover completely the inner surface of the duct wall 29. Moreover, the resulting overlaps of the metal foil strips 34 and 36 produces a duct wall 29 which has a thickness of at least three layers of foil at all places along its length. At the regions of the edges of the foil strips 34 and 36, there is a thickness of four layers. As a consequence, the duct 28 is substantially airtight after its wall has been convoluted.

Figure 11A:
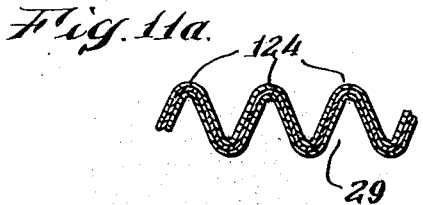

FIG. 11 shows the general pattern of the convolutions, their helical pattern actually comprising ten convolutions 124 per inch of axial length (five individual starts each including two turns per inch, making a total of ten convolutions per inch). FIG. 11A is an enlargement of a cross section of the wall 29 showing the triple ply wall structure.

In order to apply insulation covering to the corrugated duct 28, it is led as shown in FIGS. 12 and 13 into insulation applying apparatus which is included in the overall machinery. The duct 28 is supported and guided by a plurality of rollers 130 and moves up and over into a cylindrical forming member 132 having a narrow gap 133 extending longitudinally along its top. The rollers 130 near the reciprocating slide assembly 60 are continuously driven through torque-limiting friction clutches (not shown) for maintaining a continuous downstream pull on the duct 28. The forming cylinder 132 has an open mouth 135 about which its two side walls slope smoothly upwardly and curve up and over in the region at 134, the side walls continuing to curve over until they almost meet, thus defining the narrow gap 133 for purposes of shaping the insulation, as will be explained.

A large roll 136 of fiber glass insulation material 137 is supported in a saddle defined by a plurality of rolls 130, the insulation material 137 being led from the roll 136 into position beneath the duct 28 as it approaches the mouth 135 of the forming cylinder 132. The insulation material 137 is in the form of a long strip of batting having a width equal to the circumference of the duct 28. Thus, the width of the insulation batting 137 can be wrapped once around the duct 28 without its edges overlapping.

A roll 140 of covering material 141 is also supported on rollers 130 in a position behind the other roll 136. The covering material 141 is a glass cloth strip coated with neoprene, the width of this covering material being slightly larger than the width of the insulation batting strip 137 so that its edges extend beyond the edges of the insulation strip. The covering material 141 is led forward beneath a baffle 142 so that the covering material progresses forward beneath the strip of insulation batting 137.

As the covering 141 and insulation material 137 enter the upwardly the mouth of the forming cylinder 132 the upwardly sloping and curving side walls 134 wrap the covering and insulation around the duct 28. A hold-down roll 143 presses the duct down firmly to center it into the enclosing insulation batting. The edges of the covering material 141 protrude up through the gap 133, the positioning of the covering material being such that one of its edges protrudes up further than the other. The extending edge engages a foldover guide 144 which folds the extending edge down over the other edge to form a seam protruding up through the gap 133.

An automatic stapling device 146 positioned above the gap 133 secures this seam by permanently stitching it closed with a row of relatively closely spaced crimped staples. Thus, the duct 28 is enclosed with a layer of fiber glass insulation batting surrounded by a covering of glass cloth having a permanently stitched seam extending longitudinally along the duct.

To pull the insulated duct through the forming cylinder 132 a pair of counter-revolving rubber V-belts 148 pinch the protruding seam between themselves in the manner of a travelling vise. The gripping portions of the revolving V-belts 148 are backed up by a plurality of small back-up rollers (not shown).

The drive for these gripper feed belts 148, includes an electric motor 150 and a worm gear speed-reducing gear unit 151 which drives a vertical shaft 152 extending up to a drive pulley for revolving one of the gripper feed belts 148. Another similar shaft (not shown) on the other side of the machine is driven by gearing 153 so as to receive the other belt 148 at the same speed.

For reducing the frictional drag between the outer surface of the covering material 141 and the interior of the forming cylinder 132, an air-film lubrication action is provided by a plurality of nozzles 147. These nozzles 147 are connected to a compressed air line 159 which supplies air at conventional shop pressure in the range from 40 to 100 p.s.i. Thus, a film of air is created between the exterior of the insulated duct and the interior surface of the forming cylinder 132. This air film helps the insulation to be formed about the duct and helps the travelling vise 148 in pulling the duct through the forming cylinder 132.

If desired, the covering material 141 may be fed down around the marking roller 154 so that a marking or labelling device 155 can apply suitable indicia to the outer surface of the duct covering. Also, a length measuring roller mechanism 156 may be positioned near the outfeed end of the forming cylinder 132 for measuring the length of insulated duct 160 that has been manufactured. The completed insulated duct 160 is loosely coiled in a large container 157 which is mounted upon a turntable 158. Thus, the container 157 can be revolved for convenience as the insulated duct is coiled into it.

Advantageously, the process and machine as described are capable of producing the corrugated all-metal duct 28 at a rate of 12 lineal feet per minute. Thus, the duct is enabled to be made at a relatively low labor cost per foot of production. At this output rate the corrugating dies 23 and 24 are both revolving at 288 r.p.m. and the spool assembly 32 is revolving at a rate of approximately 160 r.p.m. The centrifugal forces on the spools in the revolving assembly 32 impose a practical upper limit on the speed of production. A foil material for the strips 34 and 36 which may be used to advantage is Alcoa Alloy 1100–H19 having a thickness of 0.003 of an inch and a width of 2⅜ inches. The kraft paper strip 38 has the same width and has a thickness of 0.007 of an inch. The interior diameter (I.D.) of the duct after the paper strip 38 has been removed averages 2.050 of an inch. The effective wall thickness is 0.08 of an inch, including the depth of the corrugations plus the triple ply thickness. The resultant corrugated duct 28 is substantially air-tight and is desirably flexible for convenience of installation.

From the foregoing description it will be understood that the present invention provides a process and machine for manufacturing insulated, substantially air-tight duct conveniently at low cost with other advantages as discussed above, and it is to be understood that the scope of the present invention as defined by the following claims is intended to include elements which are equivalent of those being claimed hereinafter.

What is claimed is:

1. A process for manufacturing a flexible tubular duct having a helically corrugated, substantially air-tight, wall of all-metal construction comprising the steps of simultaneously revolving inner and outer mating screw threaded dies in a predetermined direction, helically wrapping a strip of friction reducing material upon a hollow forming mandrel, to define a temporary inner surface of the duct wall, helically wrapping a plurality of strips of metal foil upon said friction-reducing strip to define the duct wall having multiple plies of metal foil therein, said strips of metal foil being helically wrapped in the opposite direction from the direction of rotation of said inner and outer dies, applying lubricant to the outer surface of the duct wall, passing the duct wall between said inner and outer dies for helically corrugating the duct wall with a plurality of helical corrugations per lineal inch of duct length while at the same time continuously feeding the duct downstream by the screw action of said revolving dies, and peeling the friction-reducing strip from the inner surface of the duct wall by applying a pulling force to the strip in an upstream direction through said hollow forming mandrel to leave an all-metal flexible tubular duct which is substantially air-tight.

2. A process for manufacturing a flexible tubular duct having a helically corrugated wall of all-metal construction as claimed in claim 1 in which said helical corrugations are initially formed closely spaced in said wall by said revolving dies, including the steps of axially stretching said duct wall for spacing said corrugations further apart, and peeling said friction-reducing strip from the inner surface of the duct wall after said corrugations have been stretched further apart.

3. A process for manufacturing a flexible tubular duct having a helically corrugated wall of all-metal construction as claimed in claim 1 in which said strips of metal foil are aluminum having a thickness of 0.003 of an inch and said duct wall includes at least three layers of said aluminum foil strips.

4. A process for manufacturing a flexible tubular duct having a helically corrugated wall of all-metal construction as claimed in claim 1 in which said friction-reducing strip has the same width as said metal foil strips and is helically wrapped upon said hollow mandrel in the same direction as said metal foil strips.

5. A process for manufacturing a flexible tubular duct having a helically corrugated wall of all-metal construction as claimed in claim 1 in which said metal foil is aluminum, mechanicaly sensing the locus of peeling separation of said friction-reducing strip from the interior surface of the duct wall, transmitting information relative to the sensed position of the locus of peeling through the aluminum duct wall by a magnetic field, responding to the magnetic field outside of the duct for controlling the application of said pulling force for regulating the locus of separation.

6. A process for manufacturing a flexible tubular duct having a helically corrugated wall of all-metal construction as claimed in claim 5 in which the application of said pulling force is limited to be less than the breaking strength of the friction-reducing strip being peeled.

7. A process for manufacturing an insulated flexible tubular duct having a helically corrugated, substantially air-tight wall of all-metal construction comprising the steps of simultaneously revolving inner and outer mating screw threaded dies in a predetermined direction, helically wrapping a strip of friction-reducing material upon a hollow forming mandrel to define a temporary inner surface for the duct wall, helically wrapping a plurality of strips of metal foil upon said friction-reducing strip to define the duct wall having multiple plies of non-magnetic metal foil therein, said strips of metail foil being helically wrapped in the opposite direction from the direction of rotation of said inner and outer dies, applying lubricant to the outer surface of the duct wall, passing the duct wall between said inner and outer dies for helically corrugating the duct wall with a plurality of helical corrugations per lineal inch of duct length while at the same time continuousy feeding the duct downstream by the screw action of said revolving dies, applying a pulling force to the friction-reducing strip in an upstream direction through said hollow forming mandrel for peeling said strip from the interior surface of the duct wall to form an all-metal flexible wall which is helically corrugated and is substantially air-tight, and applying insulation around the exterior surface of said duct.

8. A process as claimed in claim 7 including the step of stretching the corrugated duct in an axial direction for axially spacing the corrugations before said strip is peeled from the interior surface of said duct.

References Cited

UNITED STATES PATENTS

| | | | |
|---|---|---|---|
| 1,004,644 | 10/1911 | Gilson | 29—435 |
| 1,661,835 | 3/1928 | Keller | 29—423 |
| 2,006,333 | 7/1935 | Angell et al. | 57—7 |
| 2,525,300 | 10/1950 | Jones | 29—202.5 X |
| 3,128,216 | 4/1964 | Reed | 156—184 |

JOHN F. CAMPBELL, Primary Examiner

V. A. DI PALMA, Assistant Examiner

U.S. Cl. X.R.

29—202.5; 93—80